United States Patent [19]

Grubbs et al.

[11] Patent Number: 4,567,244

[45] Date of Patent: Jan. 28, 1986

[54] RING OPENING POLYMERIZATION OF MONO-OLEFIN RING COMPOUNDS

[75] Inventors: Robert H. Grubbs; Laura R. Gilliom, both of Pasadena, Calif.

[73] Assignee: California Institute of Technology, Pasadena, Calif.

[21] Appl. No.: 594,354

[22] Filed: Mar. 28, 1984

[51] Int. Cl.[4] .............................................. C08F 4/64
[52] U.S. Cl. .................................. 526/160; 526/170; 526/308
[58] Field of Search ..................... 526/160, 170, 308

[56] References Cited

U.S. PATENT DOCUMENTS 3,252,956  5/1966  Natta et al. ......................... 526/308
4,200,716  4/1980  Pez ..................................... 526/160

*Primary Examiner*—Paul R. Michl
*Assistant Examiner*—Alex H. Walker
*Attorney, Agent, or Firm*—Marvin E. Jacobs

[57] ABSTRACT

A monomer containing a strained olefin ring such as cyclobutene or cyclopropene is polymerized by forming a complex of the monomer and $Cp_2TiCH_2$-(Cp is $\eta^5$-$C_5H_5$) and heating the complex in the presence of excess monomer to above the decomposition point. A controlled, selective opening of the ring with the strained olefin forms a linear, soluble polymer.

9 Claims, No Drawings

RING OPENING POLYMERIZATION OF MONO-OLEFIN RING COMPOUNDS

DESCRIPTION

1. Origin of the Invention

The invention described herein was made in the performance of work under contracts with the National Science Foundation and is subject to the provisions of the National Science Foundation Act Under National Science Foundation Grant No. CHE-8214668.

2. Background of the Invention

The invention relates to the polymerization of ring compounds and, more particularly, to the selective ring-opening polymerization of ring compounds containing a single strained double bond.

DESCRIPTION OF THE PRIOR ART

Numerous catalysts are known for the ring-opening polymerization of cyclic olefins. A wide variety of transition metal salt catalysts such as tungsten, molybdenum and rhenium have been reported for use in general ring opening polymerization. However, the catalysts require the presence of a co-catalyst and none of these catalysts display high selectivity for strained unsaturated bonds over other potentially reactive functionalities. Diolefin monomers are polymerized to high molecular weight, insoluble, intractable masses and/or to polymers having wide dispersions of molecular weights. The dispersity of these polymers can be as low as 4, but usually is in the range from 10–20. These catalysts are Lewis acids which are reactive with oxygen substitution or ether linkages and cannot be used with oxygen-containing monomers.

The "Tebbe" reagent, $[\eta^5-C_5H_5]TiCH_2 \cdot AlClMe_2$, has been shown to react with olefins in the presence of pyridine to form titanacyclobutanes. The latter have been shown capable of functioning as intermediates in olefin metathesis [T. R. Howard, et al., *J. Am. Chem. Soc.*, 102, 6876 (1980)]. Howard, Grubbs and Marchand (Southeast/Southwest Regional Meeting of ACS, Program Abstracts, Dec. 10, 1980) report the reaction of norbornene with the Tebbe reagent in the presence of pyridine to form a titanacyclobutane intermediate which can be used to promote ring-opening polymerization of norbornene. The polymer is not identified nor is there any indication of selectivity between strained rings and other functionalities. During catalyst preparation, the dimethylaluminum moiety of the Tebbe reagent is eliminated by reaction with pyridine. Some appears to remain as an impurity in the resulting polymer.

STATEMENT OF THE INVENTION

A polymerization system for the selective ring-opening polymerization of a strained olefin has been developed in accordance with the invention. The catalyst is a one-component catalyst that is readily prepared and removed from the polymer. The work up and clean up of the polymer are much easier than the Lewis acid or Ziegler-Natta type catalysts previously utilized for ring-opening polymerization. The resulting polymers have low molecular weights and are substantially soluble in common solvents.

The invention also relates to an improved method of preparing the catalyst in the presence of a base which forms an insoluble adduct with the byproduct of the catalyst dissociation. An active catalyst has also been formed that does not contain any aluminum. This catalyst emits a volatile by-product which further simplifies polymerization and recovery of the polymer.

In the polymerization system of the invention, a complex precursor of $Cp_2TiCH_2$ (Cp is $\eta^5-C_5H_5$) and an excess of monomer containing a strained olefin is allowed to react at temperatures above and decomposition point of the metallacycle formed from the olefin and $Cp_2Ti=CH_2$:

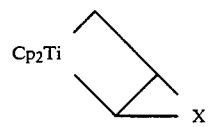

Opening of the strained olefin ring occurs to form a linear, stereoregular, soluble polymer chain having non-polymerized groups pendant from the chain.

These and many other features and attendant advantages of the invention will become apparent as the invention becomes better understood by reference to the following detailed description.

DETAILED DESCRIPTION OF THE INVENTION

In the polymerization system of the invention, an active catalyst is formed by first reacting a unit of monomer of the formula:

where X is a homocarbon or heterocarbon linkage containing from 1 to 2 chain atoms, preferably $(CR_2)_y$, and where y is 1 to 2 and R is selected from H, alkyl, alkoxy, or aryl such as phenyl, with a source of $Cp_2TiCH_2-$ according to the following reaction:

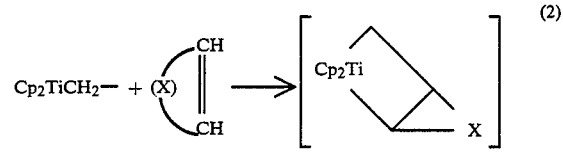

The active actalyst (2) reacts with excess monomer to form a polymer having the following repeating unit:

Precursor souces of $Cp_2TiCH_2-$ can be the Tebbe reagent:

or

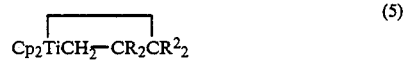

where $R^1$ and $R^2$ are selected from lower alkyl of 1 to 6 carbon atoms, monocyclic aryl such as phenyl, lower alkoxy of 1 to 6 carbon atoms, or hydrogen and Cp is $\eta^5$—$C_2H_5$. The monomer can be selected from cyclobutene or cyclopropene or the substituted derivatives.

Polymerization is effected by forming a mixture of catalyst reagent and excess monomer and heating the mixture to the decomposition temperature at which ring-opening occurs. Cyclopropenes and butenes appear to react below room temperature.

Polymerization with the Tebbe reagent is usually conducted in presence of pyridine. However, the catalyst eliminates $AlR^1{}_2Cl$ during polymerization which is soluble in the catalyst solvent. In an improved catalyst preparation method described in copending application Ser. No. 594,355, entitled Polymerization of Difunctional Ring Compounds, filed concurrently herewith, the disclosure of which is incorporated by reference herein, the catalyst preparation is conducted with a base that forms an insoluble adduct with $AlR^1{}_2Cl$ such as 4-dimethylaminopyridine (DMAP) or tetramethylenetetramine (TMTA). The Tebbe reagent is mixed with a stoichiometric amount of the base and an excess of monomer in inert solvent such as benzene, toluene, or methylene chloride. The reaction occurs at temperatures below ambient.

Another and preferred method of preparing the catalyst is to eliminate aluminum by using compound (5). Compound (5) when reacted with monomer in solution with stirring at room temperature forming the titanacyclobutane catalyst by elimination of volatile component (isobutylene when $R^1$ is Me and R is H) which is removed by venting.

Experiments were conducted according to the following general procedure. All operations were carried out either in an inert atmosphere dry box or on a vacuum line using standard Schlenk techniques. Toluene was degassed and dried over sodium benzophenone-ketyl prior to vacuum transfer and use. Methanol was degassed prior to use. Cyclobutene was prepared by the Pb(OAc)$_4$ decarboxylation of trans-1,2-cyclobutanedicarboxylic acid. It was stored under vacuum at room temperature.

Cp$_2$TiCH$_2$C(Me)$_2$CH$_2$ was perpared as previously reported:

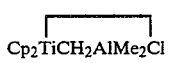   (6)

and

   (7)

were prepared according to established procedures (K. Ott, D. Straus, Ph.D. Theses, California Institute of Technology, 1983). 4-dimethylaminopyridine (Aldrich) was recrystallized from toluene.

NMR spectra was recorded on a JEOL FX-90Q (89.60 MHz $^1$H, 22.53 MHz $^{13}$C) instrument. IR spectra were recorded on a Beckman 4240 spectrophotometer. Polymer molecular weight distributions were determined using a Waters Model 4000 HPLC.

EXAMPLE 1

Polymerization 4 mL toluene followed by 0.1 mL (1.3 mmol) cyclobutene was vacuum transferred onto 15 mg (0106 mmol)

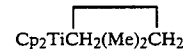

at 77 K. The mixture was warmed to $-20°$ C. with stirring. The cooling bath was removed and the solution was stirred for 45 min.

Workup

On addition of 5 mL acidic MeOH, a viscous oil separated from the solution. After stirring 5 min, the liquid was removed by cannula and the oil was dried under vacuum. Estimated yield, 90 percent.

Characterization

The polymer was characterized by comparison of its $^1$H NMR, $^{13}$C NMR, and IR data with literature values for polybutadiene. The cis:trans ratio is 40:60.

Polymerization of cyclobutene is found to result in the formation of a stereoregular, linear 1, 4 polybutadiene with about equal amounts of cis and trans structure. The cyclobutene is polymerized in very high yield to a viscous liquid.

It is to be realized that only preferred embodiments of the invention have been described and that numerous substitutions, modifications and alterations are permissible without departing from the spirit and scope of the invention as defined in the following claims.

We claim:

1. A method of polymerizing a monomer containing a strained olefin within a cyclic group selected from compounds of the formula:

where X is $(CR_2)_y$, y is an integer from 1 to 2 and R is selected from H, alkyl of 1 to 6 carbon atoms, alkoxy of 1 to 6 carbon atoms, or monocyclic aryl;

comprising the steps of mixing an excess of said monomer with Cp$_2$TiCH$_2$— where Cp is cyclopentadiene to form a titanacyclobutane complex of the formula:

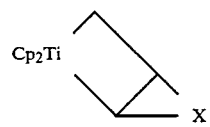

heating the mixture to a temperature above the decomposition temperature of the complex and selectively opening said strained olefin ring to form a linear polymer containing repeating units of the formula:

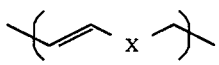

2. A method according to claim 1 in which the polymer has a solubility exceeding 40 percent by weight.

3. A method according to claim 1 in which said source is selected from compounds of the formula:

where $R^1$ and $R^2$ are selected from alkyl of 1 to 6 carbon atoms, monocyclic aryl, alkoxy of 1 to 6 carbon atoms, or hydrogen.

4. A method according to claim 3 in which $R^2$ is methyl and $R^1$ is H.

5. A method according to claim 3 in which the source is a mixture of a base and a compound of the formula:

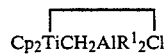

6. A method according to claim 5 in which $R^1$ is methyl.

7. A method according to claim 5 in which the base forms an insoluble addjuct with $AlR^1_2Cl$.

8. A method according to claim 7 in which the base is selected from dimethylaminopyridine or tetramethylenetetramine.

9. A method according to claim 1 in which the monomer is cyclobutene.

* * * * *